(12) United States Patent
Cobbley et al.

(10) Patent No.: US 6,501,464 B1
(45) Date of Patent: Dec. 31, 2002

(54) ON-SCREEN TRANSPARENT KEYBOARD INTERFACE

(75) Inventors: David A. Cobbley, Portland, OR (US); William C. DeLeeuw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 09/703,159

(22) Filed: Oct. 31, 2000

(51) Int. Cl.[7] .................................................. G09G 5/00
(52) U.S. Cl. ........................................ 345/173; 345/773
(58) Field of Search ................................. 345/173, 174, 345/175, 773, 802

(56) References Cited

U.S. PATENT DOCUMENTS 5,581,243 A * 12/1996 Ouellette et al. ............ 345/173
5,638,501 A 6/1997 Gough et al.
6,121,960 A * 9/2000 Carroll et al. ............... 345/173

FOREIGN PATENT DOCUMENTS

| WO | WO 98/09270 | 3/1998 |
| WO | WO 99/50737 | 10/1999 |

OTHER PUBLICATIONS

ComputerUser.com High–Tech Dictionary entry for "focus" at http://www.computeruser.com/resources/dictionary.*

* cited by examiner

*Primary Examiner*—Steven Saras
*Assistant Examiner*—William C. Spencer
(74) *Attorney, Agent, or Firm*—Trop, Pruner & Hu, P.C.

(57) ABSTRACT

A graphical user interface in the form of a transparent keyboard may be positioned over an existing computer display. The user may input textual data through the keyboard by selecting keys in the transparent keyboard display. The text entry may then appear on the computer display in non-transparent or conventional format.

15 Claims, 7 Drawing Sheets

ON-SCREEN TRANSPARENT KEYBOARD INTERFACE

BACKGROUND

This invention relates generally to display devices for processor-based systems.

A large number of processor-based systems have relatively limited input/output capabilities. For example, some handheld computer systems have no associated keyboard. Text entry may occur using a touch screen as one example. The user may enter data through an on-screen keyboard by touching the appropriate areas for each key-using a stylus or finger.

A number of other handheld computer devices including Internet tablets and personal digital assistants (PDAs) may have a need for better ways to facilitate data entry. Providing an on-screen-dedicated keyboard takes up an excessive amount of the available display space. This is especially so, since in many situations, no data entry may be required yet a portion of the display may be lost to accommodate the keyboard.

A user may wish to enter data into a dialog box or web page field. Thus, the user would like to see the dialog box and the keyboard at the same time. With many limited display screens, this is not possible. For example, there may be insufficient display space to enable data entry through the on-screen keyboard as well as to enable a clear view of the available information.

A number of devices include keyboards of sufficiently reduced size that data entry for text information is somewhat difficult to accomplish. In these cases as well, it may also be desirable to have a better way to enter textual data into processor-based systems.

Thus, there is a continuing need for better ways to facilitate the entry of data without using a physical keyboard.

DETAILED DESCRIPTION

Figure 1:
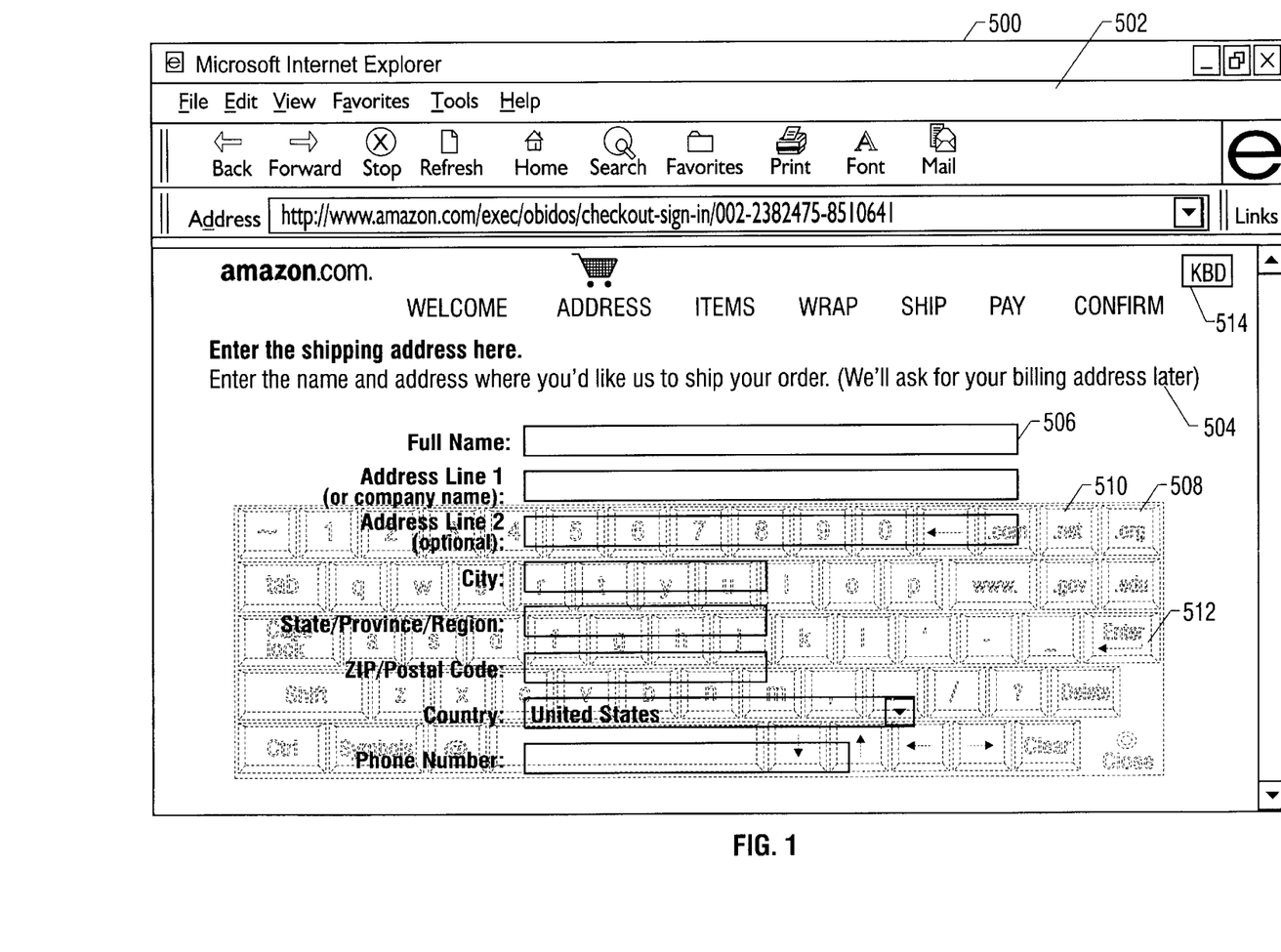
FIG. 1 is a depiction of a screen display in accordance with one embodiment of the present invention.

A display 500 may be associated with a processor-based system, such as an Internet tablet, a personal digital assistant, a handheld processor-based system or any other processor-based system, as shown in FIG. 1. In the illustrated embodiment, the graphical user interface 502 is a browser display showing a web page 504 associated with an Internet web site. In this case, the Internet web site provides a number of text entry boxes 506 for completion by the user.

Appearing as if it were superimposed over the page 504 is a transparent keyboard interface 508. The interface 508 is illustrated in dotted lines to indicate a relatively transparent display that enables the user not only to see the key images 510 and the indicia 512 written on the key images 510 but also to see effectively "through" the key images 510 to the apparently underlying text and graphics. As a result, the user can read the information associated with the text entry boxes 506 at the same time the user selects key images 510 to enter the data on the transparent keyboard interface 508. By "transparent" it is intended to refer to the capability that text or graphics may appear to be viewable below or through "transparent" text or graphics.

In some embodiments of the present invention, the display 500 may be a touch screen display. In another embodiment, a conventional display may be utilized, such as a liquid crystal display, in which a mouse may be utilized to select particular key images 510 for text entry. As still another option, a voice input capability may be used to enable keys to be selected by voice as well.

Thus, the user may selectively enter the data by selecting the transparent key images 510 causing text to be entered into a selected data entry box 506. In some embodiments of the present invention, the interface 502 may be selectively placed in either a keyboard mode or a non-keyboard mode. In the keyboard mode, selecting any of the key images 510 causes text to be entered into the text entry boxes 506. In the non-keyboard mode, the key images 510 are inactive and the user can select one of the text entry boxes 506, as an example, for text entry. This may be done even in cases where the interface 508 appears to overlay the associated text entry box 506. In this way, the focus of the processor-based system may be placed on the keyboard interface 508 or the text entry boxes 506 as an example. The mode selection may be made by selecting the appropriate icon 514 using a pointing device such as a mouse or stylus, in one embodiment of the present invention. In another embodiment focus may be changed by using a hardware button.

By a mixing operation, signals representing two relatively distinct screen images, such as the keyboard interface 508 and the text entry boxes 506, may be electronically mixed to make it appear that one of the screen images overlays the other. In fact, neither image is above or below the other. Instead, electronic representations of a first image and a second image may be mixed to create the impression to the user that one layer overlays the other since the user believes that the user is looking through one image to see the other image.

The transparency of a given image, such as the keyboard interface 508 or the text entry boxes 506, may be changed dynamically. For example, if the user fails to enter text using the keyboard interface 508 after a predetermined amount of time, the transparency of the keyboard interface 508 may increase while the transparency of the text entry boxes 506 may decrease. As a result, the focus appears to change to the text entry boxes 506 that appear to be bolder and more prominent than the keyboard interface 508. Thus, in a variety of circumstances, automatic, dynamic changes in transparency may be implemented by adjusting the relative mixing of the representations of two disparate images.

An operating system output frame buffer is an area of memory used to store the current display data of the computer system. The operating system output frame buffer may be allocated in any memory available to the operating system. A frame buffer is a set of storage locations to store a two-dimensional array of pixel data. The operating system output frame buffer may be associated with operating system software of the computer system which controls the generation and display of the data signals on a computer monitor.

A transparent frame buffer is an area of memory used to store the display data of the transparent keyboard interface 508, shown in FIG. 1, for substantially simultaneous display with the other conventional, nontransparent display data signals in text or graphics on the same page 504. The conventional text and graphics are derived from an operating system output frame buffer. The transparent frame buffer may be allocated in any memory available in the system.

The display components of the operating system output frame buffer and the transparent frame buffer may be combined by color mixing the corresponding pixels of each buffer, in some embodiments, while interleaving the resulting pixels of the color mixing operation with the operating system output frame buffer's pixels to form the display components of a visible display frame buffer.

In accordance with embodiments of the present invention, a method for producing transparency effects employs reduced mixing of display contents. Instead, it may rely on the human eye's inability to distinguish between the color of adjacent pixels on a computer monitor (in essence, the human eye averages each pixel with its neighbor). Some mixing is employed, because large computer monitors and low display resolutions may result in a "checkerboard" effect when pixels are interleaved in this manner.

In one embodiment, one half of the pixels from a first frame buffer (such as the operating system output frame buffer) are averaged with one half of the pixels from a second frame buffer (such as the transparent frame buffer) as the pixels of the two frame buffers are interleaved into a display buffer whose data is currently being rendered visible on a display. By averaging a fraction of the pixels, there may be a decrease in the processing power used when providing the transparency effect. In alternate embodiments, different percentages of pixels may be averaged (e.g., one fourth of the pixels, one eighth of the pixels, one sixteenth of the pixels, one thirty-second of the pixels, or any one Nth of the pixels where N is a positive integer), and the percentages may be changed dynamically.

Figure 2:
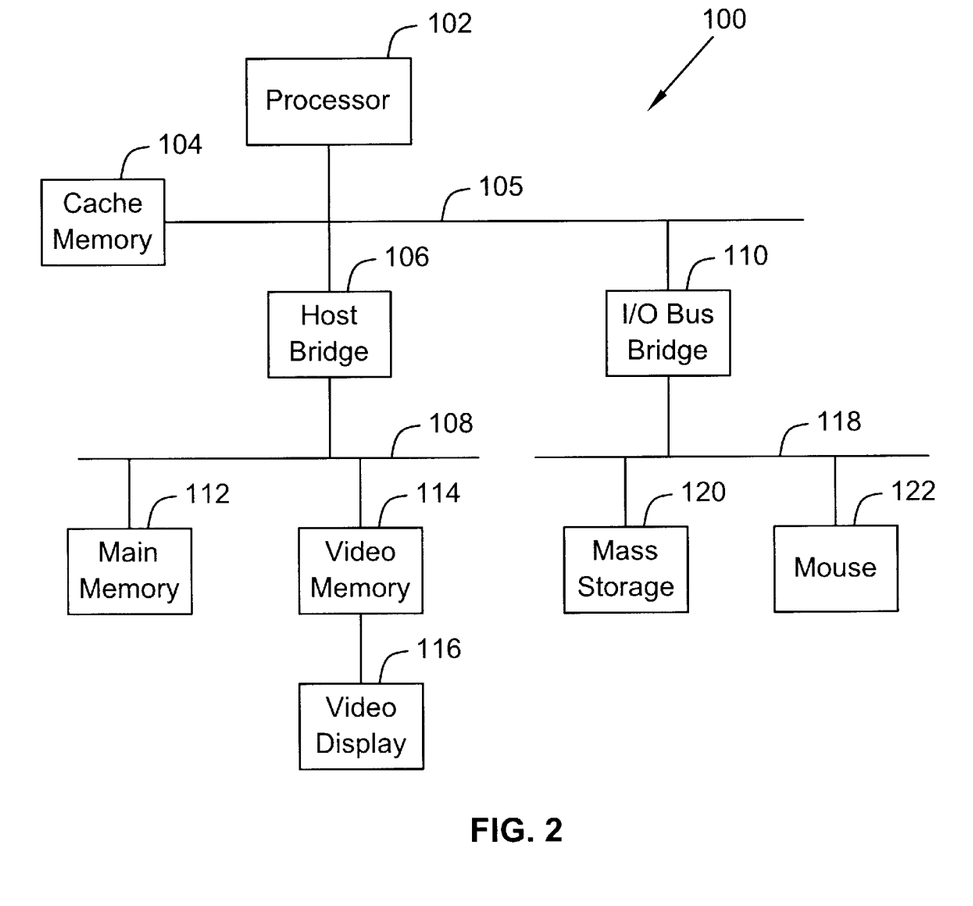
FIG. 2 is a diagram illustrating a sample system capable of being operated with a transparency method in accordance with an embodiment of the present invention.

FIG. 2 is a diagram illustrating a sample system capable of being operated with a method for producing transparency displays in accordance with the present invention. Sample system 100 may be used, for example, to execute the processing for the methods described herein. Sample system 100 is representative of computer systems based on the PENTIUM®, PENTIUM® Pro, and PENTIUM® II microprocessors available from Intel Corporation, although other systems may also be used. Sample system 100 includes microprocessor 102 and cache memory 104 coupled to each other through processor bus 105. Sample system 100 also includes first I/O bus 108 and second I/O bus 118. Processor bus 105 and first I/O bus 108 may be bridged by host bridge 106, whereas first I/O bus 108 and second I/O bus 118 may be bridged by I/O bus bridge 110. Coupled to first I/O bus 108 may be main memory 112 and video memory 114. Coupled to video memory 114 may be video display 116. Coupled to second I/O bus 118 may be mass storage 120, and a mouse or other pointing device 122.

Mass storage 120 may be used to provide long-term storage for the executable instructions for a method for providing a transparent keyboard interface in accordance with embodiments of the present invention, whereas main memory 112 may be used to store on a shorter term basis the executable instructions of a method for providing transparent displays in accordance with embodiments of the present invention during execution by microprocessor 102. In addition, the instructions may be stored on other machine readable mediums accessible by the system, such as compact disk read only memories (CD-ROMs), digital versatile disks (DVDs), and floppy disks, for example.

Figure 3:
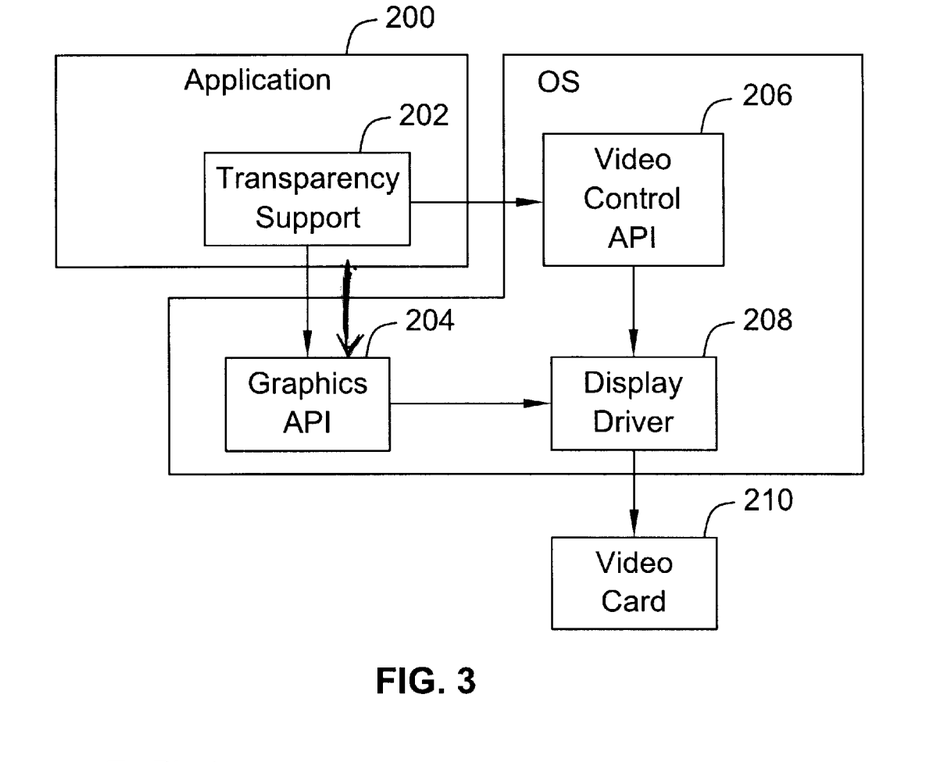
FIG. 3 is a diagram of a software and hardware stack for implementing transparent graphics according to an embodiment of the present invention.

FIG. 3 is a diagram of a software and hardware stack for implementing transparent graphics according to one embodiment of the present invention. Application programs 200 may be specifically designed to use transparent display object call functions provided by transparency support software 202 to define and update the transparent display objects. That is, certain calls to such functions may be programmed into application programs in order to use transparency display features. An on-screen transparent keyboard interface application may be one example of such an application program.

In response, transparency support software 202 calls the operating system graphics rendering application programming interface (graphics API) 204 in this embodiment. In the Windows 95® and Windows 98® operating systems, for example, this may be the Graphics Device Interface (GDI). The transparency support software 202 also calls the operating system's video hardware control abstraction application programming interface (video control API) 206 in this embodiment. In the Windows 95® and Windows 98 operating systems, this may be the DirectDraw API, available from Microsoft Corporation. In some operating systems, the graphics API 204 and video control API 206 may not be distinguishable from each other as they may exist within the same application programming interface.

The graphics API 204 may be used to render requested graphics to the transparent graphics frame buffer 18. The video control API 206 may be used to control frame buffer visibility and to access the contents of all frame buffers. In this embodiment, the graphics API 204 and video control API 206 interact with display driver software 208 to communicate with video card 210. The video card 210 controls the video display in the system of FIG. 2. The video card 210 accesses video memory 114 to obtain display data.

Generally, images may be displayed on a display such as a liquid crystal display (LCD), for example, by creating a frame buffer of pixel data in video memory 114. This frame buffer may be designated as a visible portion of video memory by video control API 206. If there is a sufficient amount of video memory available, multiple frame buffers may be defined, only one of which may be used at a time (by the video card 210) to obtain the data signals for building the current visible display.

In a well known double buffering technique, a first frame buffer is considered to be the "visible" buffer and the video card 210 reads data signals from it to obtain the current display data signals, while a second frame buffer (or "non-visible" buffer) is written to with new display data. In this embodiment, the video control API is then called upon to "flip" the frame buffers by designating the second frame buffer to be the visible buffer and designating the first frame buffer to be the non-visible buffer. Use of this technique provides for the smooth update of display data, resulting in aesthetically pleasing displays for the user. Embodiments of the present invention may extend this concept to employ extra frame buffers to provide the transparent display data signals in conjunction with normal display data.

Figure 4:
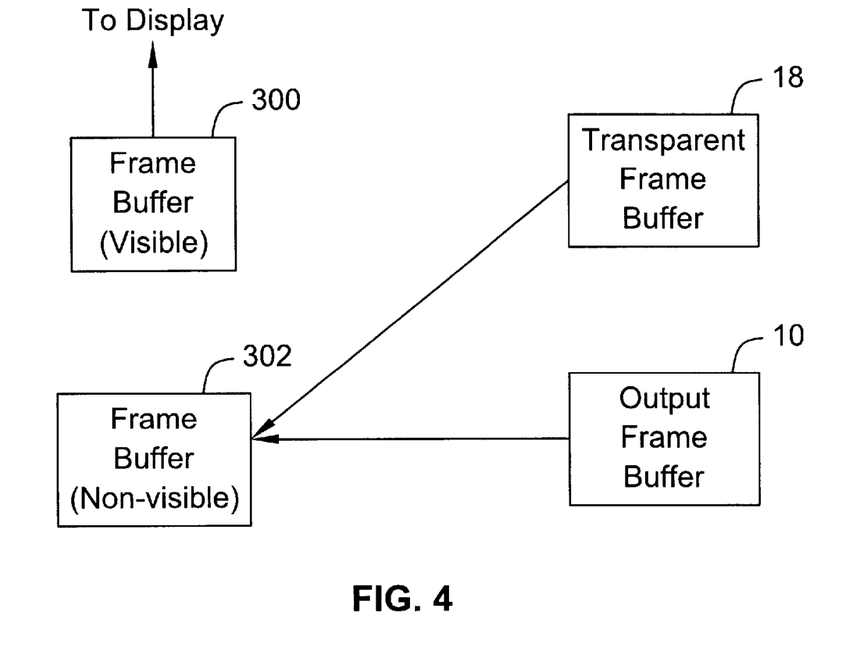
FIG. 4 is a diagram of the buffers for providing transparent graphics according to one embodiment of the present invention.

FIG. 4 is a diagram illustrating an embodiment of multiple frame buffers used for providing transparent graphics. One designated portion of the video memory 114 may be assigned to be displayed as visible on the computer monitor at a time. This is called the "visible display". That is, the visible display comprises the display data from an area of video memory 114 that is currently displayed for viewing by a user. Generally, in this embodiment the graphics API 204 of the operating system software writes data signals into the operating system output frame buffer 10 using display driver 208 and/or video control API 206. In most current systems, the operating system output frame buffer 10, resident in video memory 114, is used for the visible display. However, in embodiments of the present invention, other frame buffers may be used as the visible display.

A first working frame buffer 300 and a second working frame buffer 302, both resident in video memory 114 or other accessible memory, store display data according to embodiments of the present invention. In this embodiment, each frame buffer 300 or 302 stores an array of pixel data signals. Each pixel may include red (R), green (G), blue (B), and optionally, opacity (A) components in one embodiment. Alternatively, other color spaces such as YUV or YUVA may also be used. Transparent frame buffer 18, resident in main memory 112, in this embodiment stores transparent display data created by transparency support software 202, video control API 206, and graphics API 204.

In one embodiment, data signals from the transparent frame buffer 18 may be color mixed and interleaved with data signals from operating system output frame buffer 10, and then stored in a working frame buffer 302. This mixed and interleaved data may be stored into a working frame buffer 302 when the working frame buffer 302 is in a "non-visible" state (that is, in this embodiment the data stored in the frame buffer is not currently displayed). While the working frame buffer 302 is being written to in a non-visible state, the working frame buffer 300 may be in a "visible" state and used as the source of current display data.

When the color mixing and interleaving operations are complete for a working frame buffer 302, the non-visible working frame buffer 302 may be designated the visible working frame buffer and vice versa. This double buffering process may be repeated.at a rate of more than five times per second in one embodiment to provide a visually appealing display to a user.

In embodiments of the present invention, interleaving of the pixels of the transparent frame buffer 18 and the operating system output frame buffer 10 may be accomplished as follows. In one embodiment, alternating pixels in the selected working frame buffer 302 may be written by a mix of a transparent frame buffer 18 pixel value and a spatially corresponding operating system output frame 10 buffer pixel value. The other pixels in the selected working frame buffer 302 may be written with pixels from the operating system output frame buffer 10.

Figure 4A:
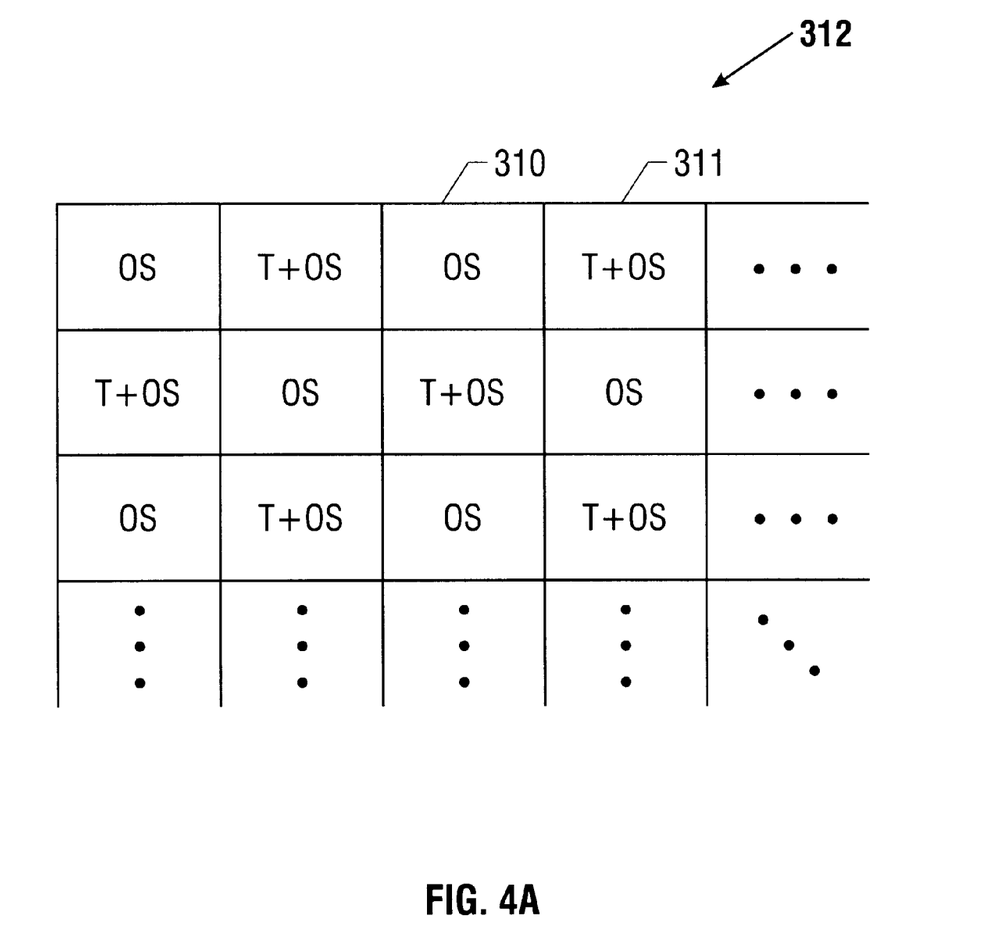
FIG. 4A is a schematic depiction of a pixel mixing arrangement according to one embodiment of the present invention.

FIG. 4A is a schematic depiction of a pixel mixing arrangement in one embodiment of the present invention. The element 312 represents a working frame buffer, while blocks 310 and 311 represent specific pixels within said frame buffer. In one embodiment of one method of alternating pixel mixing between the transparent frame buffer 18 and the operating system output frame buffer 10, a "T+OS Mix" pixel 311 in the selected working frame buffer comprises a color averaged mix of a pixel from the transparent frame buffer 18 (the T value) and a pixel from the operating system output frame buffer 10 (the OS value). An "OS" pixel 310 in the selected working frame buffer 302 contains a spatially corresponding pixel copied from the operating system output frame buffer 10. Thus, the T+OS pixels are interspersed with the OS pixels as illustrated in FIG. 4A, to achieve a desired transparency effect.

In this embodiment, color averaging may be performed through a weighted averaging scheme on each color component of each pixel from corresponding positions within the two frame buffers 18 and 10, although in other embodiments, different color mixing techniques may also be employed. In one embodiment, weighted averaging may be accomplished by multiplying a component value of a first pixel by a weight value and multiplying the same component value of a second pixel by a different weight value. The two weighted color components may then be added together and the resulting sum may be divided by the sum of the two weight values. This method is also known as alpha blending.

Figure 5:
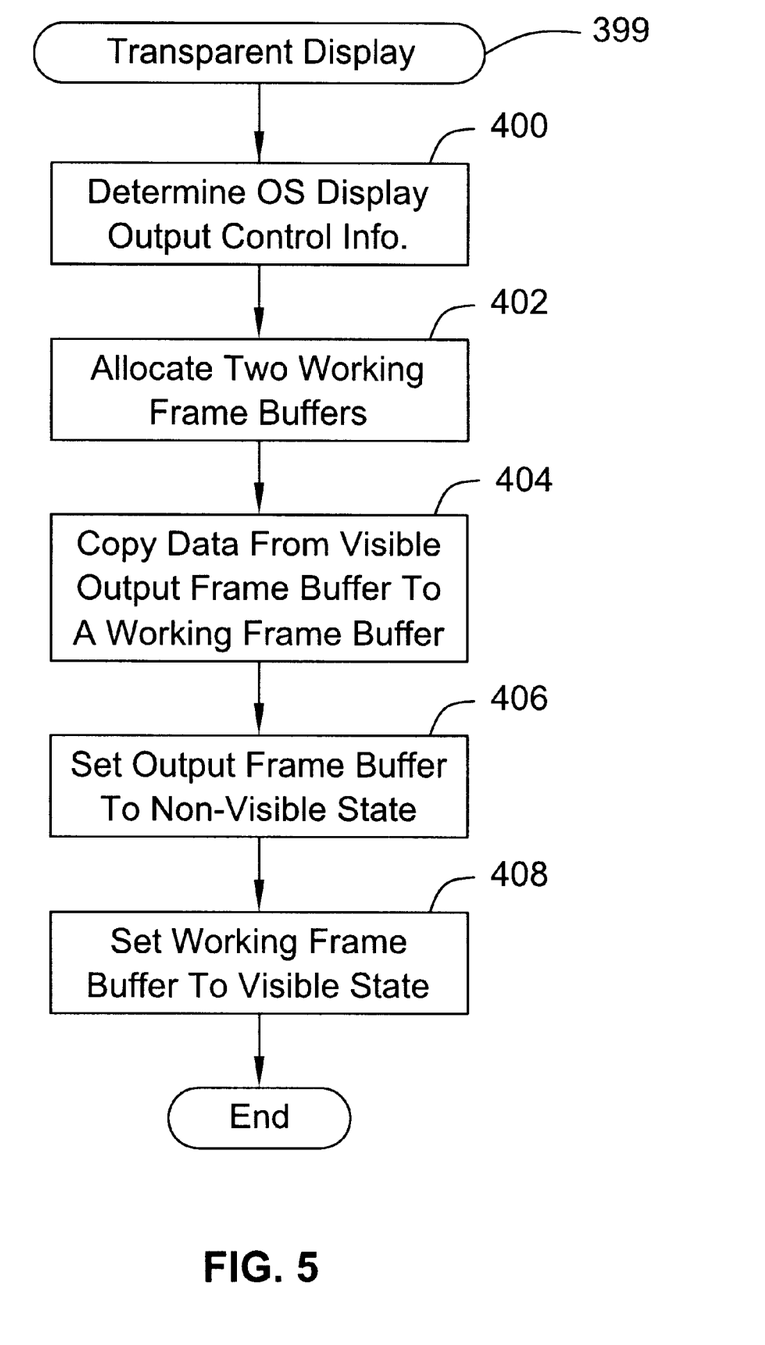
FIG. 5 is a flow diagram for initializing a system to provide transparent graphics according to one embodiment of the present invention.

FIG. 5 is a flow diagram for software 399 illustrating an embodiment for initializing a system to provide transparent graphics. At block 400, the operating system display output control information may be determined. This control information comprises the size of the display, color resolution, and other data. Next, at block 402, two working frame buffers 300, 302 may be allocated in video memory 114 in this embodiment. These operations may be performed by calls to the video control API 206 in this embodiment. At block 404, a block transfer operation may be performed to copy data from the normally visible operating system output frame buffer 10 to a selected one of the two working frame buffers 300, 302. Assume for this example that the working frame buffer 300 is selected first. The block transfer may be performed by a call to the video control API 206 in this embodiment. At block 406, the operating system output frame buffer 10 may be set to a "non-visible" state by a call to the video control API 206. At block 408, the selected working frame buffer 300 may be made visible (block 408) by a call to the video control API 206 in this embodiment. In some embodiments, block 406 and block 408 may be accomplished by a single call to the video control API. At this point, the video card's current display output data is obtained from the selected working frame buffer 300, not the operating system output frame buffer 10.

Figure 6:
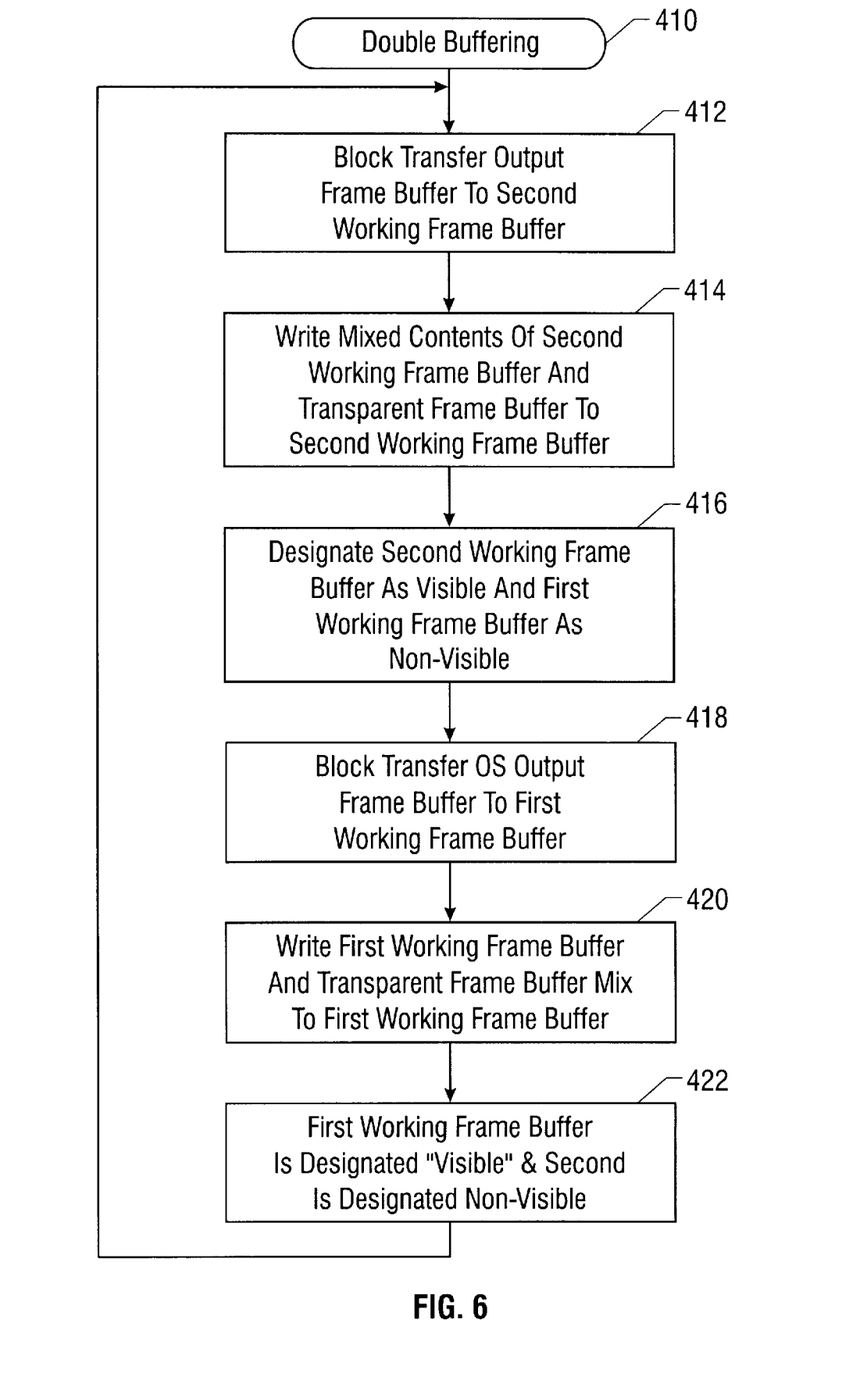
FIG. 6 is a flow diagram showing double buffering control processing according to one embodiment of the present invention.

FIG. 6 is a flow diagram showing an embodiment of double buffering software 410. A block transfer operation may be performed at block 412 to copy the operating system output frame buffer 10 to the non-visible second working frame buffer 302 by a call to the video control API 206 in this embodiment. At block 414, an operation may be performed to write the mixed and interleaved contents of the non-visible second working frame buffer 302 and the transparent frame buffer 18 to the second working frame buffer 302. At block 416, the second working frame buffer 302 is made visible and the first working frame buffer 300 is made non-visible, in effect, flipping the two frame buffers as the current display output data source.

At block 418, a block transfer operation may be performed to copy the operating system output frame buffer 10 to the non-visible first working frame buffer 300 by a call to the video control API 206 in this embodiment. At block 420, an operation may be performed to write the color mixed and interleaved contents of the first working frame buffer 300 and the transparent frame buffer 18 to the first working frame buffer 300. At block 422, the first working frame buffer 300 is made visible and the second working frame buffer 302 is made non-visible, in effect, flipping the two frame buffers as the current display output data source. This process may be repeated by returning to block 412. During each of the previous blocks, the operating system software may be concurrently writing additional display data into the operating system output frame buffer.

Figure 7:
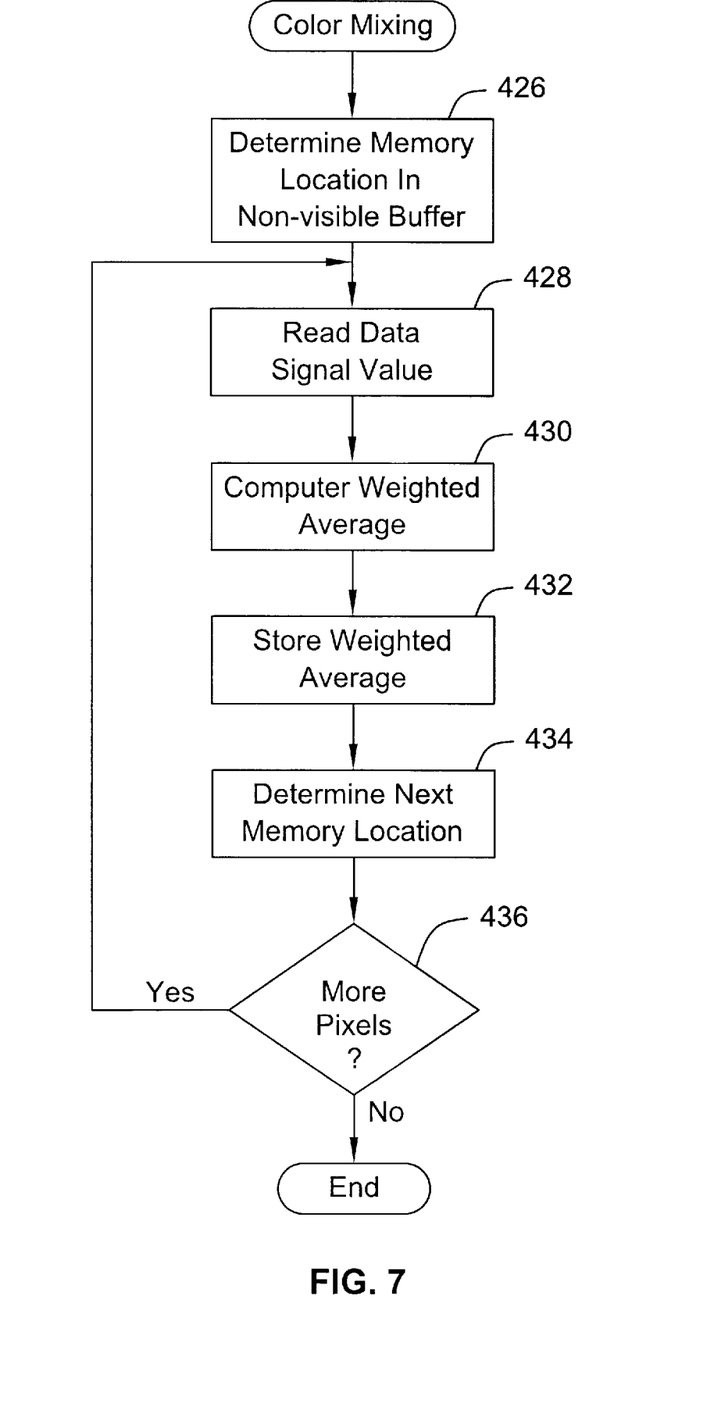
FIG. 7 is a flow diagram of color mixing and interleaving processing according to one embodiment of the present invention.

The color mixing and interleaving operation of blocks 414 and 420 is further described with reference to FIG. 7. At block 426, a memory location in the currently non-visible (either the first or the second) working frame buffer may be determined for a reference point of the transparent graphics frame buffer. At block 428, a data signal value for a pixel from the currently non-visible working frame buffer may be read and the spatially corresponding pixel(s) from the transparent graphics frame buffer may be determined. This correspondence is not necessarily a 1:1 ratio since the transparent graphics frame buffer image may be stretched or reduced to fit a portion of the working frame buffer. This pixel correspondence determination is well known in the art and is commonly used in stretch block transfers in operating system software (e.g., the StretchBit function in the Windows 95® operation system).

Next, at block 430, in this embodiment the weighted average of the pixel from the working frame buffer and the pixel from the transparent graphics frame buffer may be computed. The weighted averages of the individual pixel components may be determined on a color component by color component basis. That is, red components may be averaged, blue components may be averaged, and green components may be averaged. The weight that is given to each of the components determines the resulting transparency of the pixel, however the same weight value may be used for all components of a given pixel. It is the weight associated with a pixel that affects, at least in part, the level of transparency. These weights may be manipulated by the application program employing transparency to achieve various mixing ratios. Furthermore, the application program employing transparency may provide user interface elements that allow the user to control the mixing ratios directly or indirectly.

The result of the weighted averaging computation may be placed into the same location in the working frame buffer at block 432 as the current pixel being processed. At block 434, the next location in the working frame buffer to be processed may be determined, taking into account the current interleaving pattern (e.g., using every second pixel, every fourth pixel, horizontally or vertically alternating lines, etc.). At diamond 436, if more pixels of the working frame buffer and the transparent graphics frame buffer are to be processed, processing continues with block 428 with the next pixel. Otherwise, color mixing and interleaving processing ends.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   generating a text entry user interface on a computer screen;
   generating a transparent keyboard interface on said computer screen, said interface including key images;
   overlying said transparent keyboard interface over said text entry user interface;
   enabling a user to enter data in the text entry user interface element using said transparent keyboard interface;
   changing the focus between said text entry user interface and said transparent keyboard interface in response to user activation of a user selectable element; and
   recognizing key selections made through said transparent keyboard interface when focus is on the transparent keyboard interface.

2. The method of claim 1 including generating a textual display on said computer screen and overlaying said transparent keyboard interface over said textual display.

3. The method of claim 1 wherein recognizing key selections includes recognizing contact with a touch screen.

4. The method of claim 1 wherein recognizing key selections includes recognizing pointing device selections of key images associated with said transparent keyboard interface.

5. The method of claim 1 including selectively enabling information to be entered through said transparent keyboard interface or another interface.

6. The method of claim 5 including providing a user selectable element to enable the user to select whether data is entered through said transparent keyboard interface or another interface.

7. An article comprising a medium storing instructions that enable a processor-based system to:
   generate a text entry user interface element on a computer screen;
   generate a transparent keyboard interface on said computer screen, said interface including key images;
   in response to the detection of the activation by a user of a user selectable element, change the focus between said text entry user interface element and said transparent keyboard interface; and
   recognize key selections made through said transparent keyboard interface only when focus is on said transparent keyboard interface.

8. The article of claim 7 further storing instructions that enable the processor-based system to generate a textual display on said computer screen and overlay said transparent keyboard interface over said textual display.

9. The article of claim 7 further storing instructions that enable the processor-based system to recognize contact with a touch screen.

10. The article of claim 7 further storing instructions that enable the processor-based system to recognize pointing device selections of key images associated with said transparent keyboard interface.

11. The article of claim 7 further storing instructions that enable the processor-based system to selectively enable information to be entered through said transparent keyboard interface or another interface.

12. The article of claim 11 further storing instructions that enable the processor-based system to provide a user selectable element to enable the user to select whether data is entered through said transparent keyboard interface or another interface.

13. A system comprising:
    a processor-based device; and
    a storage coupled to said processor-based device, said storage storing instructions that enable the processor-based device to generate a text entry user interface on a computer screen, generate a transparent keyboard interface on said computer screen, said interface including key images, recognize a user selection of said text entry user interface or said transparent keyboard interface, change focus between said transparent keyboard interface and said text entry user interface element in response to said user selection, and recognize key selections made through said transparent keyboard interface only when the user has selected the transparent keyboard interface for text entry.

14. The system of claim 13 including a display screen.

15. The system of claim 14 including a pointing device coupled to said processor-based device.

* * * * *